(No Model.)

B. O'DONNELL.
MARKING AND DROPPING ATTACHMENT FOR CORN PLANTERS.

No. 410,605. Patented Sept. 10, 1889.

Witnesses
N. B. Harris
J. K. Shand

Inventor
Bryan O'Donnell
Fitzgerald & Co
Attorneys

UNITED STATES PATENT OFFICE.

BRYAN O'DONNELL, OF VAIL, IOWA.

MARKING AND DROPPING ATTACHMENT FOR CORN-PLANTERS.

SPECIFICATION forming part of Letters Patent No. 410,605, dated September 10, 1889.

Application filed April 23, 1889. Serial No. 308,293. (No model.)

*To all whom it may concern:*

Be it known that I, BRYAN O'DONNELL, a citizen of the United States, residing at Vail, in the county of Crawford and State of Iowa, have invented certain new and useful Improvements in Marking and Dropping Attachments for Corn-Planters; and I do hereby declare the following to be a full, clear, and exact description of the invention, such as will enable others skilled in the art to which it appertains to make and use the same.

My invention has relation to markers and droppers for planting corn and the like; and it consists in the construction and novel combination of parts, as will be hereinafter fully described and claimed.

Figure 1:
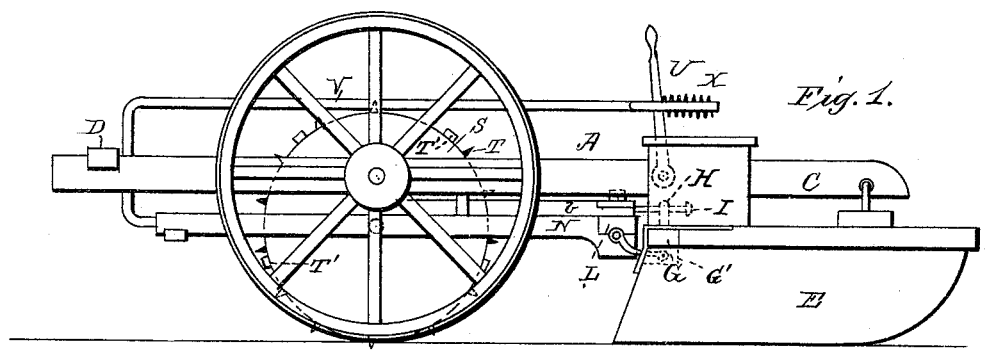
Figure 2:
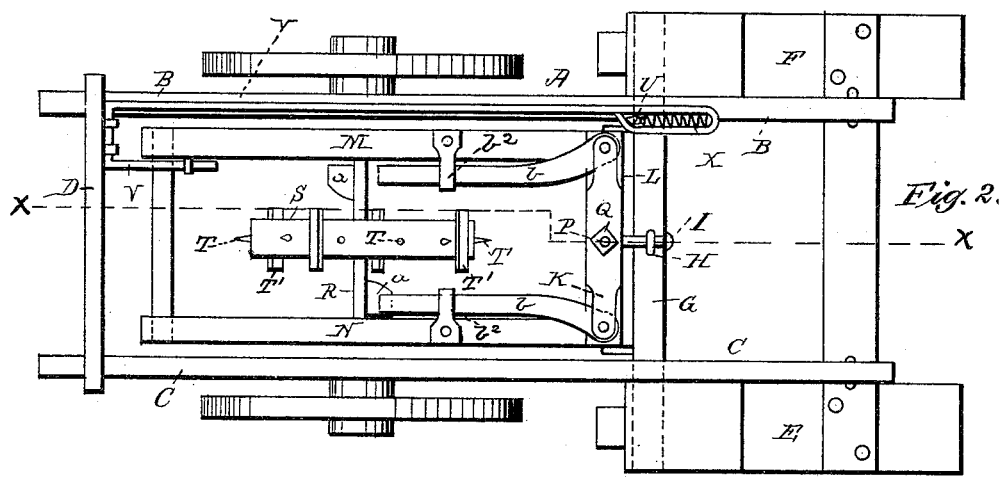
Figure 3:
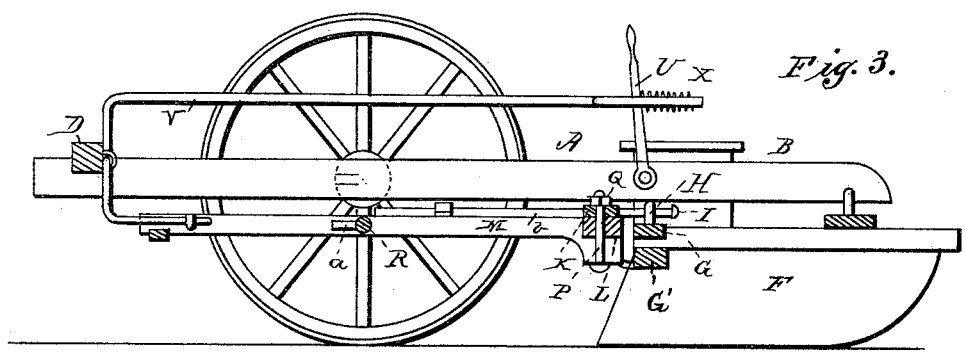

In the drawings, Figure 1 is a side elevation of a marker and planter embodying the improvements of my invention. Fig. 2 is a plan view of the same, and Fig. 3 is a vertical longitudinal sectional view on the line X X in Fig. 2.

Referring by letter to the accompanying drawings, A designates the frame of the marker and planter, which is composed of two parallel beams B C, connected at their rear ends by a transverse bar or cross-beam D, and provided at their front ends with connected opening and dropping shoes E F, of any preferred or well-known construction, which shoes E F are provided at their rear ends upon their upper faces with a reciprocating seed-slide bar G, which is provided at its middle portion with a staple or eye H, projecting upwardly, and receives a forwardly-projecting rod I, which is seated in the front edge of the short pivoted cross-bar K, which latter is secured to the cross-bar L, attached to the upper faces of the front ends of the shorter parallel hinged beams M N by a bolt P, having an adjusting-nut Q at its upper end. The shorter parallel beams M N serve as supports or bearings for the axle R of the marking-wheel S, and are hinged at their forward ends to a transverse brace-bar G', which wheel is provided with radially-projecting pins T, to prevent said wheel from slipping or dragging over the ground, and for marking the distance of the hills of corn or the like I also provide the wheel S with markers T', which can be placed at any desired distance apart on the wheel.

At the front end of one of the parallel beams—viz., B—is secured a lever U, said lever rising upward, connected to crank-lever V, extending rearwardly over the frame of the machine, and at its rear end is bent to engage the beam M. Its forward end is bent back upon itself and has secured in said bent portion a coil-spring X. By pulling on lever V the rear ends of the parallel beams M N may be raised or lowered to regulate the depth to which the pins T on the marker-wheel may penetrate the ground, also to allow the markers T' to mark the place where the corn has been dropped.

$a$ are tappets on the axle R of the marker-wheel, projecting in opposite directions, and therefore operate alternately upon the short levers $b\ b$, which are pivoted at their front ends to the bar K and pass through slides $b^2$, secured to the bars M N, and alternately strike the tappers $a$ and cause the slide-bar G to drop the corn.

The main frame is mounted on the usual bearing-wheels.

Having thus fully described my invention, what I claim as new, and desire to secure by Letters Patent, is—

1. In a marking and dropping planter, the combination, with the main frame A, composed of parallel side beams B C, united at their front and rear ends by cross-bars and supported by the bearing-wheels, of the shorter beams M N, hinged at their forward ends to the transverse brace-bar G' and located intermediate of the beams B C and parallel therewith, designed to support the axle R, provided on opposite sides and ends with tappets $a$, said beams M N being adapted to have a vertical movement within the side beams B C, and thereby raise and lower the axle R, the marker-wheel S, secured to said axle intermediate of the beams M N and provided with markers T' and spurs T, the cross-bar K, pivoted at its center upon a pin P, projecting from the bar L, the levers $b\ b$, pivoted at their forward ends to the outer ends of the bar K and passing through guides $b^2$, secured to the beams M N, the rear ends of said levers lying adjacent to and adapted to be struck by the tappets $a$ when the axle R revolves, and the forwardly-projecting pin I, passing through a staple H on the slide G, as described, for the purpose specified.

2. The combination, with the main frame, of the frame composed of the shorter parallel beams M N, located within the main frame and supporting the axle R, provided with the opposed tappets $a$, the wheel S, secured to said shaft, the cross-bar K, loosely pivoted at its center by the pin P and provided in its ends with the levers $b$ $b$, passing through guides $b^2$ $b^2$ and engaging the tappets on the axle, the forwardly-projecting pin I, located in the forward edge of the bar L at the center thereof and engaging a staple H on the seed-slide, whereby a hinged connection is made, the lever V, passing over the frame, bent at its rear end to engage the beam M, the forward end bent to receive the coiled spring X, the lever U, secured to the side beam B, passing upwardly and passing at the rear end of the coiled spring, substantially as described.

In testimony whereof I affix my signature in presence of two witnesses.

BRYAN O'DONNELL.

Witnesses:
W. H. CASEY,
R. C. MOLSEED.